Figure 1:
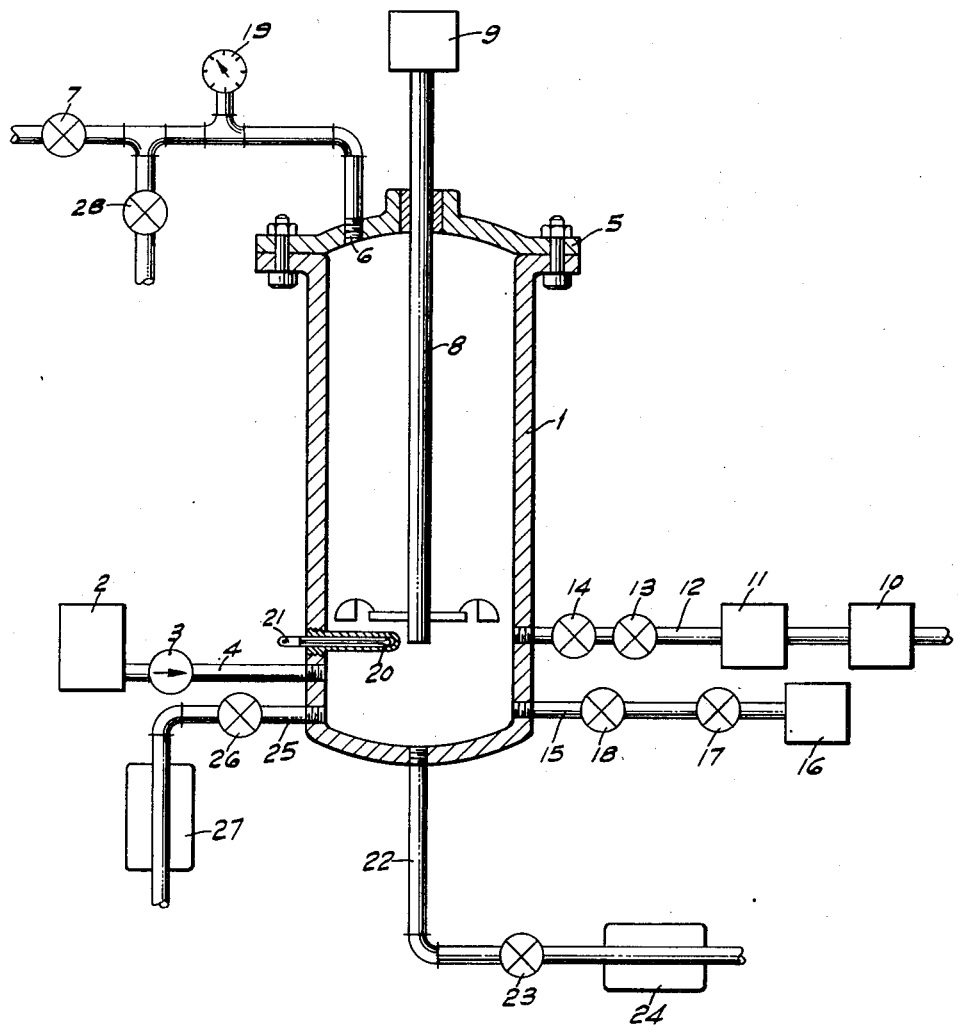

Nov. 27, 1951  J. H. FISHER ET AL  2,576,752
METHOD OF PRODUCING VANILLIN
Filed Jan. 7, 1949

INVENTORS
J. H. FISHER & H. B. MARSHALL
BY
ATTORNEY

Patented Nov. 27, 1951

2,576,752

UNITED STATES PATENT OFFICE 2,576,752

METHOD OF PRODUCING VANILLIN

John Henry Fisher, St. Catharines, Ontario, and Harry Borden Marshall, Toronto, Ontario, Canada, assignors to The Ontario Paper Company Limited, Thorold, Ontario, Canada Application January 7, 1949, Serial No. 69,815
In Canada August 11, 1948

11 Claims. (Cl. 260—600)

This invention relates to the production of vanillin, acetovanillone and other oxidation products from lignosulfonic acid compounds such as waste sulphite liquor and especially from the same after treatment such that the fermentable sugar content thereof has been reduced.

It is well known that lignosulfonate materials can be used to produce vanillin and other products when subjected to oxidation under suitable conditions in the presence of caustic soda or caustic potash. Cross reference is made to the co-pending patent applications of Marshall and Sankey, Serial Number 606,690 filed July 23, 1945 now Patent No. 2,516,827 and Serial Number 767,626 filed August 8, 1947 now Patent No. 2,544,999, in which are disclosed methods of effecting production of vanillin and coproducts from lignin-containing substances in a particularly advantageous manner.

Wherever the previous art discloses a yield of vanillin greater than a relatively small trace, the alkali employed has been either caustic soda or caustic potash, i. e., an alkali which can be maintained in relatively high active dissolved concentration in the reaction mixture. It is significant that although the first proven formation of vanillin from lignin-containing substances in the presence of alkali of which we are aware, by von Grafe (Monatsch., 25, 1001 (1904)) used lime, (von Grafe's method comprised evaporating waste sulphite liquor to dryness, heating the residue with an equal weight of lime in a sealed tube for three hours at 180° C., precipitating the lime and freeing the vanillin from a water extract using carbon dioxide, extracting with ether and subsequently isolating vanillin by a bisulphite technique, the vanillin being identified by odour, melting point and elementary analysis). Neither von Grafe nor anyone since has obtained more than minute quantities of vanillin when employing lime as an alkali. Indeed the use of lime as an alkali for the purpose of preparing vanillin in more than merely nominal quantities from lignin-containing substances must be considered as contrary to normal chemical expectations as confirmed by Kurschner et al. (Tech. Chem. Papier-u. Zellstoff Febr. 29, 35 (1932)), who said that their own result of obtaining insignificant quantities of vanillin could have been foreseen and who moreover failed to increase vanillin yields by using lime as an extending agent for caustic alkali.

Provided satisfactory yields of vanillin can be obtained, the use of lime as an alkali for the treatment of wast sulphite liquor is of definite economic advantage over the corresponding use of caustic soda. Economic conditions dictate either the recovery of active alkali from the caustic soda or some other direct and economical use for the residual alkali. When this active alkali is commercially recovered there is consumed in the recovery process an equivalent amount of lime. The recovery of alkali from a vanillin producing process using caustic soda, therefore, necessitates the consumption of an equivalent amount of lime together with the expense of the recovery operation itself. It is obvious, therefore, that a process employing lime as the active alkali during the formation of vanillin will be of considerable economic advantage and will constitute a distinct advance in the art.

In the production of sulphite pulp a calcium base is normally used for the sulphite process. The recovery of calcium base is not normal commercial practice and mills and plants producing sulphite pulp are not equipped to recovery this calcium base. The use of lime in accordance with our present invention is therefore particularly well adapted to integrate with a sulphite pulping process without the necessity of additional plant for alkali recovery. Our invention is not limited to the use of waste sulphite liquor but includes any lignin-containing material in which the lignin is present in a lignosulfonate form. The liquor remaining after sulphite liquor has been subjected to fermentation to produce ethyl alcohol (which residual liquor is hereinafter referred to as "alcohol plant effluent") is a particularly suitable material for the application of our invention.

We have discovered that a gas containing free oxygen, for example, air may be used as an oxidizing agent in the presence of lime to produce vanillin in satisfactory yields from lignosulfonate materials.

The principal requirement is that the lignosulfonate materials must be subjected to an adequate exposure to oxygen in a reaction vessel but not to overexposure which would result in lower vanillin yields and in the extreme to complete destruction of any vanillin which had been formed. The available partial pressure of oxygen in the reaction vessel under the other reaction conditions and the time of exposure of the lignin-containing substances to such partial oxygen pressure are highly important. The exposure to oxygen is dependent on the percentage of oxygen in the gas present in the reaction vessel, the temperature and pressure in the reaction vessel, the rate of gas flow through the reaction vessel, and the conditions of agitation which are determined by the specific details of design of the apparatus.

When lime is used as an alkali in accordance with our invention, the process differs from the type disclosed in the hereinbefore mentioned pending application of Marshall and Sankey in that the bulk of the ligneous material, if not already relatively insoluble, is precipitated at an early stage of the reaction and in that throughout the reaction the bulk of the alkali is present in undissolved form. Proper agitation and provisions so that the solids present do not unduly impede the gas flow are therefore especially important in applying our invention.

The selection of preferred conditions is necessarily functional. Thus the preferred reaction time at a given temperature and given partial oxygen pressure must be selected for the particular degree and kind of agitation which is possible in the reaction vessel. A combination of conditions will normally be preferred which gives the most economical production of vanillin.

As a further guide to preferred conditions we have found that optimum yields of vanillin generally correspond to partial oxygen pressures in the reaction vessel of less than 10 lb. per sq. in. when the temperature is in the range of 175° C.–200° C. and to partial pressures of less than 20 lb. per sq. in. at temperature below 175° C.

The "partial pressure of oxygen" is determined by obtaining the absolute pressure due to all non-condensable gases in the reaction vessel and taking that percentage of such pressure as corresponds to the percentage of oxygen in such non-condensable gases. To illustrate:

Total gauge pressure in reaction vessel as observed—153 lb. per sq. in. (corresponding absolute pressure 167.7 lb. per sq. in.)
Observed temperature—170° C.
Steam pressure at 170° C. over reaction mixture from steam tables—approx. 114 lb. per sq. in. absolute. (Alternately an observed steam pressure may be used—see Example 1)
Oxygen percentage (by analysis of non-condensable gases in reaction vessel)—5.8%
Partial oxygen pressure—5.8% of (167.7–114) = 3.1 lb. per sq. in.

We have also found that the preferred reaction conditions in accordance with our invention generally involve a reaction time of less than four hours. A shorter time is normally preferred corresponding to more severe conditions of oxidation.

In practice we have employed temperatures in the range of 120° C. to 200° C. and reactor pressures in the range 50 to 300 lb. per sq. in.

If the design of the reaction vessel is such that the lignin-containing substances are not adequately exposed to oxygen it will be obvious that the preferred remaining conditions should correspond to more severe oxidation. Indeed with inefficient exposure to oxygen the limits of partial pressure of oxygen and reaction time specified in the claims may be exceeded and good vanillin yields still obtained. Such conditions are to be considered as falling within the scope of our invention. Conversely if the reaction vessel provides unusually good exposure of the lignin-containing substances the preferred remaining conditions will correspond to less severe oxidation. In the latter case indeed selection of the more severe conditions and longer reaction times will result in drastic diminution in vanillin yield. Our invention discloses that satisfactory yields of vanillin can be obtained in the general range of conditions as herein set forth and that a selection of preferred conditions in this range may readily be ascertained by anyone who is normally skilled.

An essential feature of our invention is that a minimum condition of active alkalinity must be maintained in the reaction vessel. We have found that, unless the active alkalinity is such that the pH of a liquor sample withdrawn from the reactor and then cooled to room temperature is 12 or higher, the vanillin yield will be drastically reduced. In determining the ph we have used a glass electrode especially designed to be accurate in the range of high alkalinity measurements. The requirement for the maintenance of high active alkalinity determined as above is necessary at all times throughout the reaction cycle. If the alkalinity falls below this critical level for even as short a time as say three to five minutes, the vanillin yield may be drastically lowered. The required alkalinity may be maintained by the use of an appropriate excess of lime. During the course of the reaction the decomposition products of the lignosulfonic acid compounds are largely acidic and in the presence of excess lime form their respective calcium salts. A continuing consumption of lime, therefore, takes place throughout the course of the reaction and the use of sufficient lime to provide for this consumption, while always maintaining the above stated minimum active alkalinity, is an important feature of our invention. Insufficient agitation may also cause diminution of the active alkali in localized sections of the reactor. This is an additional reason why good agitation and mixing in the reaction vessel is of prime importance.

In general, as conditions of aeration become more drastic, a larger proportion of the lignin present is converted to acidic materials, and hence a smaller quantity of lime is required when the air flow is reduced. In turn, maintenance of yield at lower air flows normally requires operation at higher partial non-condensable gas pressure. It follows that the most economical overall conditions for lime usage and also for steam consumption are those of reduced air flow and high partial pressure operation. Substantial operating economies may result from a proper selection of suitable conditions with these factors in mind.

In practising our invention we employ apparatus as illustrated in the acompanying drawing in which Fig. 1 shows in diagrammatic form an apparatus which we have used in some of our experiments comprising a reaction vessel 1 into which the reactants are introduced from the tank 2 by means of the pump 3 and pipeline 4, a cover 5 containing an opening 6 leading to a control back pressure relief valve 7 which limits the maximum pressure in the reaction system to a predetermined value and maintains the pressure thereat. The bomb contents are agitated by the agitator 8 which in Fig. 1 is shown as a turbo-mixer type. This turbo-mixer is driven by the motor 9. Compressed air is introduced from the compressor 10 through the tank 11 and the pipeline 12 into the reactor in which it is diffused by the action of the turbo-mixer 8, the pressure and rate of flow of air being regulated by the valves 13, 14.

The reaction vessel is heated by direct steaming through the pipeline 15, steam being supplied from the boiler 16 and regulated as to pressure and flow by the valves 17, 18. Other suitable heating means may, of course, be substituted. The reaction vessel is also equipped with a pressure gauge 19 and a thermometer well 20 containing a thermometer 21. The reaction vessel may be emptied through the opening 22 controlled by the valve 23 which provides for general liquor discharge. This discharge is made through the cooler 24. There is also provided a sampling line 25 controlled by the valve 26 and discharging through the cooler 27 by means of which small samples may be withdrawn at any time. A general relief valve 28 is also provided for general pressure reduction when required.

As previously noted it is a characteristic of the process according to our invention that there are present in the reactor and in the liquor discharged from the reactor a liquid phase and a mixture of solid phases which latter constitute a sludge. There is a distribution of vanillin and of the various co-products of the reaction, including acetovanillone, between the liquid phase and the sludge. Those materials which are associated with the sludge are much more difficult to recover than those which are present in the liquid phase. It is highly desirable, therefore, that as large a proportion as possible of vanillin and other desired reaction products be in the said liquid phase. We have found that the separation of the liquid phase from the sludge prior to freeing the vanillin and co-products from their condition as calcium salts promotes such a more favourable distribution as between the liquid phase and the sludge.

In our preferred practice we separate the liquid phase and the sludge of the reactor discharge by settling or filtration and then acidify the liquid phase by treatment with carbon dioxide or other suitable acidic material to a pH suitable for extraction of vanillin.

The sludge contains the great mass of reaction products other than vanillin, acetovanillone and certain related derivatives. Thus, it holds the inorganic materials (principally calcium sulphate and calcium salts of organic acids) and organic materials (ligneous residues) other than those above stated. The liquid phase is relatively free from materials other than vanillin, acetovanillone and related derivatives (present as their calcium derivatives). It is an important feature of our invention that this result, characteristic of the use of lime as an active alkali, is obtained because the subsequent extraction of vanillin from the liquid portion is greatly simplified.

In the commercial practice of our invention it may be economically advantageous to discard the sludge and only recover that portion of the vanillin, acetovanillone and related products which is present in the liquid phase. This follows in part because the greater portion of these desired products is in the liquid phase, especially when this phase is separated prior to acidification as herein disclosed; in part because there is substantially no ligneous sludge precipitated when the liquid phase is acidified, whereas such a sludge is precipitated at the corresponding point when caustic soda or caustic potash is used as the active alkali in the principal oxidation reaction and which precipitate subsequently interferes with the extraction of vanillin; in part because the acidification to a pH suitable for vanillin extraction is much more readily brought about when interfering substances have been separated. In the application of our invention a simple treatment with flue gas is sufficient to acidify the liquid phase to the required acidity for vanillin extraction with such solvents as benzene or toluene.

In our experiments it is assumed that the ratio of methoxyl content to lignin content of any of the materials investigated is 15.5 to 100. Such an assumed ratio is in accordance with current good chemical usage in dealing with lignin-containing substances. Whether this assumed ratio is or is not numerically correct is immaterial because the ratio of methoxyl to lignin may be reasonably assumed to be constant for any given lignin-containing substance. The assumption of the above ratio, will, therefore, serve for purposes of obtaining a valid relative guide to the quantity of lignin in lignin-containing substances.

The following description of experiments which have been performed by us will serve to illustrate the application and operation of our invention. It is to be understood that our invention is not limited to the materials and conditions described in these experiments which are to be considered as examples only. In the majority of our experiments the lignosulfonic acid compound used was alcohol plant effluent.

In analyzing materials for their vanillin content, two general techniques have been employed. The first is a gravimetric procedure involving the separation and estimation of vanillin in the form of its n-nitrobenzoyl hydrazone. This is described by Buckland, Tomlinson and Hibbert, Can. J. Research 16B, 54 (1938), and is the more accurate of the two procedures but involves a tedious analytical operation. We employ either as a solvent in place of trichloroethylene as described in the aforementioned reference. The second is a spectrometric method of analysis according to the general method of Lemon, Ind. Eng. Chem., Anal. ed. 19, 846 (1947). This is a rapid procedure which gives an overall measure of the substances present which are spectrometrically active at approximately 3500 $\mu\mu$, the vanillin being the principal substance present which is so active. This much more simple and rapid procedure has been used in a great deal of our work as a relative guide to the vanillin content of the various residues and has been frequently applied with the use of an appropriate empirical correction factor based on the ratio of the gravimetric to spectrometric results where both of these have been determined for the same type of residue.

*Example No. 1*

30 U. S. gal. of alcohol plant effluent, containing 53.1 grams per litre of lignin, was mixed with 25 lb. of slaked lime and the mixture charged to the reactor illustrated in drawing No. 1. The charge was heated to 170° C. by direct steaming over a period of 20 minutes and then the direct steaming continued throughout the cook at such a rate as to maintain the temperature at 170° C., the total time of heating from room temperature being 80 minutes. Throughout this 80 minute period air was passed into the reactor at the rate of 32 lb. per hour and the turbo-mixer was operated throughout the entire reaction period. The back pressure valve 7 was set at 153 lb. gauge so that the total pressure throughout the reaction was automatically maintained at this figure. Control experiments with our equipment had indicated that the steam pressure corresponding to a thermometer reading of 170° C. was 103 lb. gauge under conditions when no air was present in the reactor. The steam pressure corresponding to our thermometer reading was obtained in this manner rather than by direct reference to steam tables so that errors in our instrument readings would not affect our subsequent calculations of partial air pressure. In this cook, since the total pressure in the reactor was 153 lb. gauge and the steam pressure had been previously established as 103 lb. gauge, the partial non-condensable gas pressure in the reactor was, by difference, 50 lb. The non-condensable gases are chiefly a mixture of oxygen and nitrogen, the ratio of oxygen to nitrogen being considerably less than the air entering the reactor due to consumption of the oxygen in the reaction. The partial oxygen pressure is therefore less than 10 lb. per sq. in.

At the end of the 80 minute cooking time the reactor was discharged through a cooler and a portion of the reactor discharge containing a representative proportion of sludge was analyzed by the gravimetric procedure for vanillin and the yield was calculated to be 4.8% on a lignin basis.

Example 2

A cook was carried out as in Example #1 except that the pressure in the reaction vessel was 118 lbs. gauge. The partial non-condensable gas pressure was therefore 118–103=15 lbs. and the corresponding partial oxygen pressure less than 3 lbs. Samples were withdrawn from time to time during the course of the cook and analyzed spectrometrically. The peak vanillin yield was reached at a reaction time of 160 minutes at which time the vanillin yield as determined by gravimetric analysis was 4.8% on a lignin basis.

Example 3

A cook was conducted in the same manner as Example #1 with operating temperature 190° C. and reactor pressure 230 lb. gauge. The partial non-condensable gas pressure was calculated at 50 lb. in the same manner as described in Example #1 and therefore the partial oxygen pressure in the reactor was less than 10 lb. The peak yield of vanillin calculated, from spectrometric analysis was 5.7% at 80 minutes.

Example 4

This cook was carried out under the same conditions as described in Example #1 except that the temperature was maintained constant at 140° C. and the total reactor pressure was maintained at 91 lb. gauge. In this case the partial non-condensable pressure was calculated to be 50 lb. in the same manner as described in Example #1 and therefore the partial oxygen pressure in the reactor was less than 10 lb. The peak yield of vanillin calculated from spectrometric analysis was found to be 4.2% at 120 minutes.

Example 5

This cook was carried out under the same conditions as described in Example #1 except that the total pressure was maintained at 203 lb. gauge. The temperature was 170° C. as in Example 1, therefore the partial non-condensable gas pressure in this case amounted to 100 lb. The partial oxygen pressure in the reactor was therefore less than 20 lb. The peak yield of vanillin calculated from spectrometric analysis amounted to 5.5% at 100 minutes.

Example 6

On the comparison of gravimetric versus spectrometric analysis, an experiment was carried out under the same conditions as described in Example #1 and the yield by gravimetric analysis was found to be 5.1%. The yield on the basis of spectrometric analysis was found to be 4.85%.

When in this specification the word "pressure" is used it is to be understood that we refer to gauge pressure and not absolute pressure.

When in this specification we use the expression "lignosulfonic acid compounds" we mean thereby materials derived from lignin when so treated that sulfonic acids are formed therefrom, e. g., when lignin-containing substances are subjected to the sulphite pulping process, and including salts of the said sulfonic acids.

When in the claims we refer to the use of a pH of 12 or greater, we have reference to the determination of the pH of a liquor sample withdrawn from the reactor and then cooled to room temperature when determined according to the methods described herein.

What we claim as our invention is:

1. A method of producing oxidation products including the calcium derivative of vanillin from lignosulfonic acid compounds in an alkaline aqueous medium containing lime as the active alkali in an amount sufficient to maintain the pH of the reaction mixture determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under superatmospheric pressure, continuously passing a gas containing free oxygen in finely dispersed form through said reaction zone, continuously removing residual gas, the rate of addition and removal of said gas being such as to maintain a partial pressure of oxygen in said zone of less than 20 lb. per square inch, the time of said reaction being less than four hours.

2. The process of claim 1 wherein the partial pressure of oxygen is lower than 10 lb. per square inch when the temperature is in the range 175° C. to 200° C.

3. The process of claim 1 wherein the reaction mixture is heated to a temperature not less than 140° C. nor more than 190° C.

4. The process of claim 3 wherein the partial pressure of oxygen is lower than 10 lb. per square inch when the temperature is in the range 175° C. to 190° C.

5. The process of claim 1 wherein the lignosulfonic acid compound is sulphite waste liquor.

6. The process of claim 1 wherein the lignosulfonic acid compound is sulphite waste liquor which has been previously treated to reduce the fermentable sugar content thereof.

7. The process of claim 1 wherein the liquid portion of the reactor discharge is separated from the solid portion thereof prior to acidification to release free vanillin therefrom.

8. The process of claim 2 wherein the liquid portion of the reactor discharge is separated from the solid portion thereof prior to acidification to release free vanillin therefrom.

9. The process of claim 3 wherein the liquid portion of the reactor discharge is separated from the solid portion thereof prior to acidification to release free vanillin therefrom.

10. The process of claim 4 wherein the liquid portion of the reactor discharge is separated from the solid portion thereof prior to acidification to release free vanillin therefrom.

11. The method of producing a liquid containing the calcium derivative of vanillin said liquid being substantially free of ligneous residues and of low alkaline content, from lignosulfonic acid compounds in an alkaline aqueous medium containing lime as the active alkali in an amount sufficient to maintain the pH of the reaction mixture determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under superatmospheric pressure, continuously passing a gas containing free oxygen in finely dispersed form through said reaction zone, continuously removing residual gas, the rate of addition and removal of said gas being such as to maintain a partial pressure of oxygen in said zone of less than 20 lb. per square inch, the time of said reaction being less than four hours, and separating the liquid portion of the reactants from the solid portion thereof.

JOHN HENRY FISHER.
HARRY BORDEN MARSHALL.

REFERENCES CITED

The following references are of record in the file of this patent:

UNITED STATES PATENTS

| Number    | Name            | Date          |
|-----------|-----------------|---------------|
| 2,099,014 | Hatch           | Nov. 16, 1937 |
| 2,187,366 | Schulz          | Jan. 16, 1940 |
| 2,433,227 | Lewis et al.    | Dec. 23, 1947 |
| 2,434,626 | Salvesen et al. | Jan. 13, 1948 |

OTHER REFERENCES

Pearl, "Vanillin from Lignin Materials," Jour. Am. Chem. Soc., vol. 64 (1942), pages 1429–1431.

Ser. No. 318,386, Freudenberg et al. (A. P. C.), published Apr. 20, 1943.